(12) United States Patent
Bayley

(10) Patent No.: US 11,158,138 B2
(45) Date of Patent: Oct. 26, 2021

(54) METHOD AND SYSTEM FOR PRESERVING AND PROCESSING VEHICLE CRASH DATA EVIDENCE

(71) Applicant: Jason Bayley, Mississauga (CA)

(72) Inventor: Jason Bayley, Mississauga (CA)

(*) Notice: Subject to any disclaimer, the term of this patent is extended or adjusted under 35 U.S.C. 154(b) by 289 days.

(21) Appl. No.: 16/466,490

(22) PCT Filed: Dec. 7, 2016

(86) PCT No.: PCT/CA2016/051433
§ 371 (c)(1),
(2) Date: Jun. 4, 2019

(87) PCT Pub. No.: WO2018/102903
PCT Pub. Date: Jun. 14, 2018

(65) Prior Publication Data
US 2019/0333289 A1    Oct. 31, 2019

(51) Int. Cl.
*G07C 5/00*   (2006.01)
*G06Q 40/08*  (2012.01)
*G07C 5/08*   (2006.01)
*H04W 4/80*   (2018.01)

(52) U.S. Cl.
CPC .............. *G07C 5/008* (2013.01); *G06Q 40/08* (2013.01); *G07C 5/08* (2013.01); *H04W 4/80* (2018.02)

(58) Field of Classification Search
CPC ........ G06Q 10/00; G06Q 10/10; G06Q 10/20; G06Q 40/08; G06Q 50/18; G07C 2205/02; G07C 5/00; G07C 5/008; G07C 5/08; G07C 5/085; H04W 4/80
See application file for complete search history.

(56) References Cited

U.S. PATENT DOCUMENTS

| | | | |
|---|---|---|---|
| 2002/0194016 A1* | 12/2002 | Moribe | G08G 1/096725 701/469 |
| 2004/0102984 A1* | 5/2004 | Wahlbin | G06Q 40/08 705/4 |
| 2013/0006469 A1* | 1/2013 | Green | B60R 21/013 701/36 |

\* cited by examiner

*Primary Examiner* — Omeed Alizada
(74) *Attorney, Agent, or Firm* — Patshegen IP LLC; Moshe Pinchas

(57) ABSTRACT

A method and system for preserving and processing vehicle crash data evidence for any motor vehicle collision. The method initiates with checking and selecting from list of vehicles that support internal recording of crash event data. The method includes a field user option for extracting the hexadecimal event data stored in memory on a vehicle's airbag module by communicating through the on-board diagnostic port with a universal wireless on-board diagnostic device communicatively coupled with a user-computing device. Data preservation is achieved by requesting and saving vehicle specific code responses; data is then transmitted through a communication network to a computer integrated remotely in a laboratory for interpretation into a readable report format, so that collision specific details can be understood and analyzed. For vehicles where crash data is not retrievable, the method includes supplemental steps of either laboratory service via automated chain of custody evidence logistics, or remote field service.

17 Claims, 4 Drawing Sheets

400

EVIDENCE CHAIN OF CUSTODY TRACKING FORM

Claim Number : _____
Vehicle Stock Number : _____
Arranged By : _____  _____
Vehicle : \_\_\_\_\_ \_\_\_\_\_ _____
Location of Retrieval : _____ _____ _____
_____

Name and Address of Person who Handled Evidence (required by ASTME1188-95):
Name : _____  _____
Street Address : _____ \_\_\_\_\_  City : _____  Province : _____
Postal Code : _____  Telephone Number : _____  Signature : _____

| Description of Evidence | | |
|---|---|---|
| Item # | Quantity | Description of Item (Model, Serial #, Condition, Marks, Scratches) |
| 1 | | |
| | | |
| | | Last 8 digits of VIN # are written on module |
| | | |

| Chain of Custody | | | |
|---|---|---|---|
| Item # | Date/Time | Released by (Name & Address) | Received by (Name & Address) |
| | | | |
| 1 | | | Crash Data Central<br>2680 Matheson Blvd E, # 102<br>Mississauga, ON L4W 0A5 |
| | | Crash Data Central<br>2680 Matheson Blvd E, # 102<br>Mississauga, ON L4W 0A5 | |
| | | | |

Fig. 4

METHOD AND SYSTEM FOR PRESERVING AND PROCESSING VEHICLE CRASH DATA EVIDENCE

TECHNICAL FIELD

The presently disclosed embodiments are related, in general, to vehicles. More particularly, the presently disclosed embodiments are related to methods and systems for preserving and processing vehicle crash data evidence.

BACKGROUND ART

Conventionally, preserving stored vehicle crash event data has required specialized knowledge, training, and proprietary equipment. Vehicle telematics systems utilized by various companies have been capable of capturing and transmitting live vehicle data (data similar to that stored internally on vehicle modules following a crash event), but telematics data only includes transmission of live data through its communication network. The telematics technology is used by fleets, insurance companies or specific vehicle manufacturers, and aids in contacting a response center following a detected collision; this system then notifies the police and insurance companies about the accident. Further, there are some fleets, or insurance-based drivers who have opted to have their driving habits monitored with UBI (User-Based Insurance) telematics adapters for an insurance discount. These telematics adapters provide some meaningful data about the vehicle and driver's actions surrounding a collision, which can help insurance claims professionals assess liability and expedite claim processing.

However, privacy laws prevent the required adoption of these telematics devices by the public, which has limited their usage to only 5 to 10% of vehicles currently on the road, indicating that important crash event data is not easily or economically accessible following most vehicle collisions. Further, the live transmitted telematics data is not yet considered scientifically reliable (such as for court evidence purposes). Automobile insurance fraud alone costs billions of dollars annually, estimated at 20% of insurance premiums; thus, there is a significant financial benefit to reducing fraud. For example, crash event data is crucial information that can provide unbiased evidence of accident details for police and insurance investigators to identify staged accidents, or quantify the severity of accidents, such as in low-speed impacts where there are significant long-term injuries claimed illegitimately. Public awareness of crash data should also serve to deter fraudulent acts because scientific testing and peer-reviewed published articles have validated crash data evidence.

Therefore, there is a need for new methods and systems to facilitate and enable the economical preservation of crash data evidence for any motor vehicle collision. There is also a need of methods and systems that eliminate the physical presence of an expert with the required equipment at the vehicle to collect the vehicle crash data. Further, there is also a need of methods and systems to access the vehicle crash data evidence globally.

Further limitations and disadvantages of conventional and traditional approaches will become apparent to one of skill in the art, through comparison of described systems with some aspects of the present disclosure, as set forth in the remainder of the present application and with reference to the drawings.

The U.S. Pat. No. 8,750,904 B2 of Joseph Thomas Mader et al. is related to communication devices that gives detection, identification, and a reporting process by wireless devices within a vehicle or other transport. The data is transmitted to the server through the internet. A software based program accesses the vehicle crash report. However, the U.S. Pat. No. 8,750,904 B2 fails to retrieve information that is saved by default to the onboard vehicle memory systems during communication with its remote information management system. The present disclosed system and method retrieves information and communicates with a remote information management system, not in real-time, rather, the preservation of crash data occurs offline, and the transmission of crash data can be performed anytime, via any digital transmission method.

The GB patent 2488956 A of Wright Andrew William discloses a mobile device adapted for integration with a vehicle telematics system, configured to log driving information; for example, video footage associated with how the vehicle is driven from vehicle sensor data. Such driving information may subsequently be utilized to determine the cause of an accident, to modify driver behavior and to determine insurance premiums. However, the GB patent 2488956 A requires a telematics device or system be installed in the vehicle at the time of the accident. The present disclosed system and method does not require that the vehicle have a built-in telematics system or permanently installed on-board diagnostics device.

Various embodiments of the present invention target the requirements mentioned above and others related thereto.

SUMMARY OF INVENTION

According to embodiments illustrated herein, there may be provided a method for preserving and further processing vehicle crash data evidence. The method of preserving and further processing vehicle crash data evidence initiates with the step of checking and selecting from a list of supported vehicles through a web user interface, where the vehicles are based on a user's regional location, and those vehicles that support the internal recording of vehicle crash data. The next steps depend on the user type and the deployment condition of the vehicle's airbags after the collision. In an embodiment, the user type is at least one of a field user, and a desk user. The airbag deployment condition is at least one of deployed or not deployed.

The field user, while at the vehicle, continues with the step of extracting the vehicle crash data from one or more vehicle modules using a universal on-board diagnostic device plugged into the vehicle's on-board diagnostic port. Furthermore, the method includes the step of transmitting the extracted vehicle crash data evidence through a wireless device communicatively coupled with the universal on-board diagnostic device to a user-computing device. If the vehicle crash data is not retrievable or supported by the on-board diagnostic device, the field user is prompted to follow supplemental (desk user) steps, which include: either physically shipping the vehicle module to the laboratory, or requesting shipping of specialized equipment for remote field service. These options are further dependent on the airbag deployment condition and vehicle-specific diagnostic requirements.

Following the supported vehicle check, a desk user continues with the step of performing a diagnosis of whether one or more airbags deployed during the accident. The airbag deployment condition determines one of two possible preservation options: either lab service or remote field service. Both options require coordination with a contact at the vehicle location, such as a contact at the collision repair shop where the vehicle is being stored. If the vehicle's airbag(s) deployed, then vehicle-specific instructions and documents facilitate the removal and shipping of the vehicle's airbag module to a central laboratory; a process facilitated by automated evidence logistics including vehicle-specific instructions (such as airbag module location in the vehicle), an evidence chain of custody form and automatically generated shipping labels for printing. If the airbags have not deployed then the desk user coordinates with the vehicle contact and requests shipping of the required equipment for remote field service. The remote field service option involves the vehicle contact plugging a device into the vehicle's on-board diagnostic port. In an embodiment, the method is similar to the field user device, where a user-computing device includes plurality of first programmable instructions compatible to receive the vehicle crash data evidence from the universal on-board diagnostic device.

According to embodiments illustrated herein, there may be provided a system to preserve and further process the vehicle crash data evidence. The system includes a web user interface, a computer, a universal on-board diagnostic device, a wireless device, and a user-computing device. The web user interface is integrated with an application to check a list of vehicles supporting internal recording of vehicle crash data evidence, user type and location, vehicle specifications, and condition of the vehicle after accident. In an embodiment, the user type is pre-determined as at least one of: a field user, and a desk user. A field user utilizes a universal on-board diagnostic device to extract the vehicle crash data evidence from memory on one or more vehicle modules. A wireless device is communicatively coupled with the universal on-board diagnostic device to transmit the extracted vehicle crash data evidence to a user-computing device. If the vehicle crash data evidence is not retrievable by the on-board diagnostic device then the field user either physically ships the vehicle module to the laboratory, or requests shipping of specialized equipment. In an embodiment, the desk user performs a diagnosis to check whether one or more airbags deployed during the accident. If the airbags deployed, then the system facilitates evidence logistics for shipping the crash event recording module(s) to the laboratory, and if the airbags did not deploy, then the desk user coordinates with a vehicle contact to arrange for remote field service. Remote field service equipment comprises of a user-computing device and equipment connected to the on-board diagnostics port. In an embodiment, the user-computing device includes plurality of first programmable instructions compatible to receive the vehicle crash data evidence from the universal on-board diagnostic device.

BRIEF DESCRIPTION OF DRAWINGS

The accompanying drawings illustrate the various embodiments of the system, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which:

FIG. 4 illustrates an exemplary screenshot of an automated evidence chain of custody tracking form, in accordance with at least one embodiment.

DESCRIPTION OF EMBODIMENTS

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
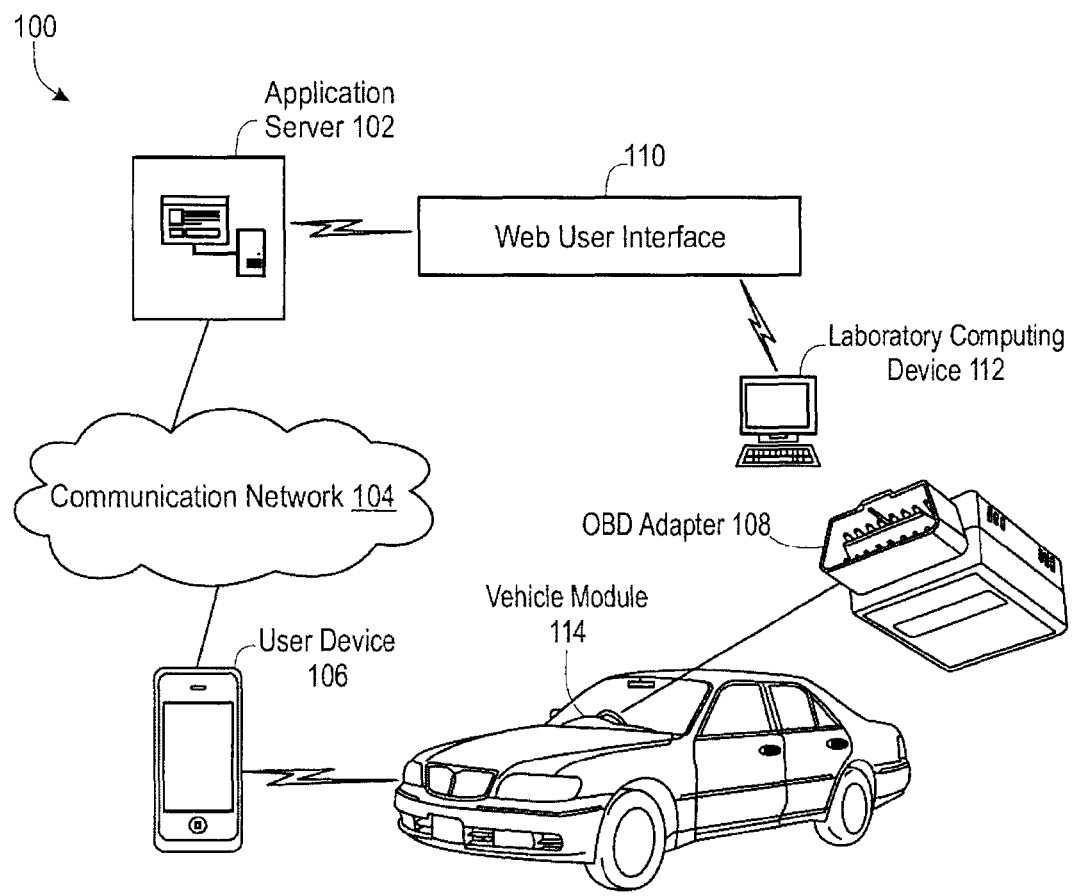
FIG. 1 is a block diagram that illustrates a system to preserve and process vehicle crash data evidence, in accordance with at least one embodiment.

FIG. 1 is a block diagram that illustrates a system 100 to preserve and process vehicle crash data evidence, in accordance with at least one embodiment. The system 100 includes a web user interface 110 integrated with a computer 112 remotely installed in a laboratory. The web user interface 110 is utilized by a user to visualize and select from a list of vehicles supported for internal recording of vehicle crash data evidence onto the airbag module. Further, the web user interface 110 depicts plurality of instructions and plurality of options depicted to guide the user to preserve the vehicle crash data evidence according to user type and/or vehicle type, and/or airbag deployment condition. Additionally, the web user interface enables the user to access the vehicle crash data evidence after processing of the vehicle crash data evidence from the hexadecimal format into a readable report document.

The system 100 further includes a universal on-board diagnostic device 108. The universal on-board diagnostic device 108 extracts the vehicle crash data evidence from one or more vehicle modules 114. In an exemplary embodiment, the vehicle module 114 is an airbag module.

An example of the on-board vehicle module memory includes but is not limited to EEPROM. The memory includes suitable logic, circuitry, interfaces, and/or code that may be configured to store the set of instructions, which are executed by the processor. In an embodiment, the memory may be configured to store one or more programs, routines, or scripts that may be executed in coordination with the processor. The memory may be implemented based on a Random-Access Memory (RAM), a Read-Only Memory (ROM), a Hard Disk Drive (HDD), a storage server, and/or a Secure Digital (SD) card.

The system 100 then includes a wireless device (not shown in FIG.) such as Bluetooth. The wireless device is communicatively coupled with the universal on-board diagnostic device (OBD) 108 to transmit the extracted vehicle crash data evidence. In an embodiment, the vehicle crash data evidence is hexadecimal event data stored in memory integrated with the airbag module. In an embodiment, the wireless device is a universal Bluetooth adaptor to establish the communication between the universal on-board diagnostics 108, and the user-computing device.

The system 100 then includes a user-computing device 106 to preserve the vehicle crash data evidence wirelessly received from the universal on-board diagnostic device 108. In an embodiment, the user-computing device 106 includes plurality of first programmable instructions compatible to request and receive responses necessary to extract the vehicle crash data evidence via the universal on-board diagnostic device 108. The vehicle crash data evidence includes various information such as, detection of impacts, accelerations at impact, vehicle speed, brake and accelerator pedal driver inputs, activation of the vehicle airbag(s), presence of an unbelted occupant etc.

In an embodiment, the user-computing device 106 may refer to a computing device used by a user. The user-computing device 106 may comprise of one or more memories. The one or more memories may include computer readable code that may be executable by the one or more processors to perform predetermined operations. In an embodiment, the user-computing device 106 may include hardware and/or software to display the retrieved vehicle crash data evidence. Examples of the user-computing device 106 may include, but are not limited to, a personal computer, a laptop, a personal digital assistant (PDA), a mobile device, a tablet, or any other computing device.

Then the system 100 includes a remote application server 102. The remote application server 102 and the user-computing device 106 communicatively coupled with each other via the communication network 104. The remote application server 102 receives the transmitted vehicle crash data evidence from the user-computing device via a communication network once available to the user-computing device. Further, the remote application server includes plurality of second programmable instructions to process the received vehicle crash data evidence. In an embodiment, the vehicle crash data evidence is retrieved with a sequence of plurality of codes corresponding to the specific vehicle. In an embodiment, the remote application server 102 may refer to a computing device or a software framework hosting an application or a software service. In an embodiment, the remote application server 102 may be implemented to execute procedures such as, but not limited to, programs, routines, or scripts stored in one or more memories for supporting the hosted application or the software service.

In an embodiment, the hosted application or the software service may be configured to perform one or more predetermined operations. The application server 102 may be realized through various types of application servers such as, but are not limited to, a Java application server, a .NET framework application server, a Base4 application server, a PHP framework application server, or any other application server framework.

A person having ordinary skill in the art will appreciate that the scope of the disclosure is not limited to realizing the application server 102 and the user-computing device 106 as separate entities. In an embodiment, the application server 102 may be realized as an application program installed on and/or running on the user-computing device 106 without departing from the scope of the disclosure.

In an embodiment, the communication network 104 may correspond to a communication medium through which the application server 102 and the user-computing device 106 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 104 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

The first programmable instruction is a custom mobile application integrated with the user-computing device 106 to extract the crash event data. The crash event data is hexadecimal data stored in memory on the vehicle module, and preservation is handled programmatically and automated through pre-determined methods. Accessing the hexadecimal data stored on the vehicle airbag module 108 requires vehicle-specific bus and PID requests; where PIDs are On-board diagnostics Parameter IDs. In one embodiment, the hex data is retrieved by capturing responses from a sequence of PID code requests unique to the vehicle (i.e. varies based on vehicle year, make, model, airbag module, etc.). Once retrieved, the hexadecimal data is then transmitted over the communication network to a remote application server 102. The hexadecimal data is then processed for interpretation by plurality of second programmable instructions into data tables and a readable report format. In one embodiment, a software "plays back" the vehicle bus responses into hardware/software in the laboratory. The present system 100 bridges the gap between the vehicle and a crash data laboratory so that the physical presence of unique manufacturer's hardware/software for interpreting crash data is not always required at the vehicle. The vehicle communication process may occur offline (non-live connection to the remote laboratory). The hex data can be transmitted over the communication network at any time.

Figure 2:
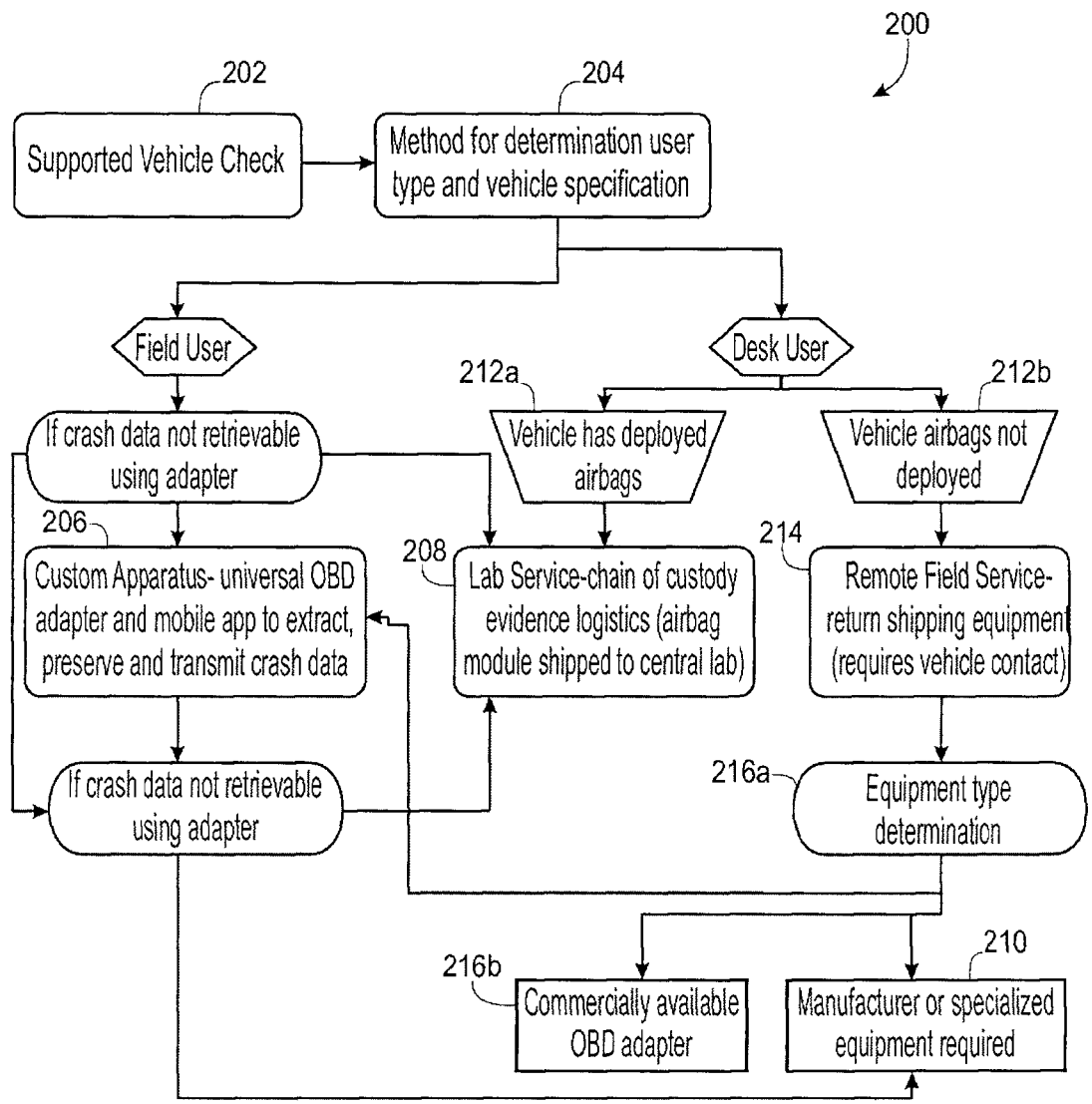
FIG. 2 is a flowchart that illustrates methods for preserving and processing vehicle crash data evidence, in accordance with at least one embodiment.

FIG. 2 is a flowchart that illustrates a method 200 for preserving and processing vehicle crash data evidence, in accordance with at least one embodiment. The method 200 is described in conjunction with FIG. 1. The method 200 of preserving and further processing vehicle crash data evidence initiates with the step 202 of checking a list of vehicles supporting internal recording of vehicle crash data evidence through a web user interface. Then the method 200 includes the step 204 of determining a user type, and vehicle-specific requirements. In an embodiment, the user type is selected from at least one of a field user, and a desk user.

Further, the method 200 includes the field user's step 206 of extracting the vehicle crash data evidence from one or more vehicle modules through a universal on-board diagnostic device by the field user. Furthermore, the method 200 includes the step of transmitting the extracted vehicle crash data evidence through a wireless device communicatively coupled with the universal on-board diagnostic device to a user-computing device. If the vehicle crash data evidence is not retrievable by the on-board diagnostic device then the field user either physically ships the vehicle module to the laboratory 208, or requests the use of specialized equipment 210.

Further, the method 200 includes the desk user's step of performing a diagnosis to check whether one or more airbags deployed during the accident. If the airbags had deployed 212a then the vehicle module is shipped to the laboratory, and if the airbags had not deployed 212b then system determines equipment type: either 206 the universal OBD adapter, 216b a commercially available OBD adapter, or 210 specialized equipment. The method 200 finalizes with the step of preserving the vehicle crash data evidence either wirelessly received from the universal on-board diagnostic device into a user-computing device or direct-to-module imaging in the laboratory. In an embodiment, the user-computing device includes plurality of first programmable instructions compatible to receive the vehicle crash data evidence from the universal on-board diagnostic device. The present method 200 processes the vehicle crash data evidence into a readable format such as but not limited to pdf or doc format.

Figure 3:
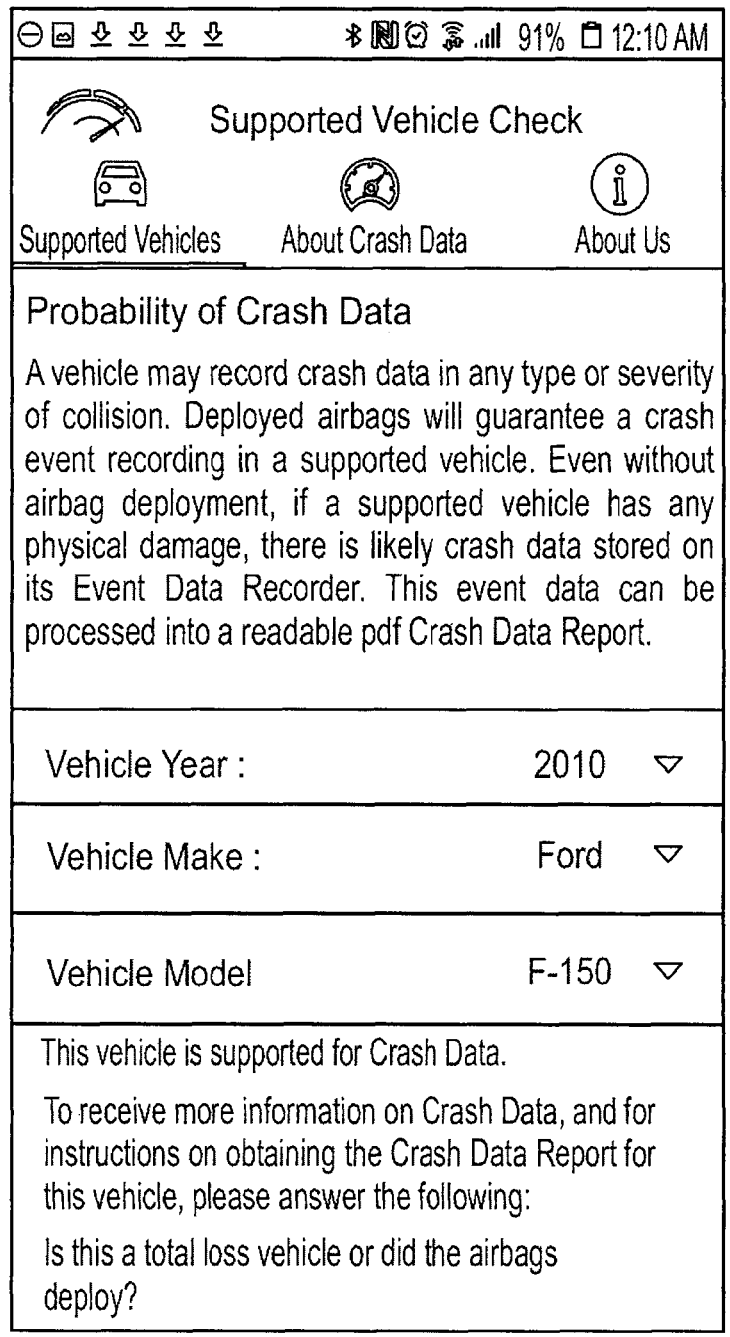
FIG. 3 illustrates an exemplary screenshot of providing a web user interface depicting the vehicles supported for internal recording of crash data evidence, in accordance with at least one embodiment.

FIG. 3 illustrates an exemplary screenshot 400 of providing a web user interface depicting the vehicles supported for internal recording of crash data evidence, in accordance with at least one embodiment. FIG. 3 is explained in conjunction with elements from FIG. 1 and FIG. 2. The web user interface is integrated with the application server 102 to provide a list of supported vehicles, which support internal crash event data recording to the airbag module. The screenshot 300 indicates the probability of crash data of a particular vehicle, and upon selection of a vehicle year, vehicle make, and vehicle model, provides further instructions on how to preserve the vehicle crash data evidence. Thus, the web user interface guides the user through a programmatically designed database system and provides further logic based instruction and options for how the user proceeds to preserve any recorded crash evidence.

FIG. 4 illustrates an exemplary screenshot 500 of an evidence chain of custody tracking form, in accordance with at least one embodiment. FIG. 4 is explained in conjunction with elements from FIG. 1 and FIG. 2. The screenshot 400 depicts the complete standard evidence tracking requirements into a systematic form. The form includes the information pertaining to vehicle identification number (VIN), stock number, claim number, vehicle brand, location of the module(s), the name and address of the person handling the evidence, and a description of the evidence, all according to ASTM standards for evidence preservation. A person skilled in the art will understand that the screenshot 400 and 500 are described herein for illustrative purposes and should not be construed to limit the scope of the disclosure.

Thus, the present method and system eliminates the need for travel to every vehicle to preserve crash event data, which also serves as an environmental benefit by reducing associated vehicle emissions. Further, the present method and system allow the user to access the vehicle crash data evidence globally. Furthermore, the present method and system extract the engineering hex data information from the airbag module, by sending and receiving a series of OBD-II PIDs. Thus, the present method and system provides various advantages including but not limited to preserving the vehicle crash data evidence for any motor vehicle collision, eliminating the physical presence of specialized equipment and a trained user at the vehicle to collect the vehicle crash data evidence, enabling accessibility to vehicle crash data evidence preservation globally etc.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

The invention claimed is:

1. A method for preserving and further processing vehicle crash data evidence, the method comprising logic based steps including:

first checking, and selecting from a list of vehicles supporting internal recording of crash event data through a web user interface, where the following preservation steps, and provided instructions are based on user type and location, in which the user type is at least one of: a field user in contact with the vehicle, and a desk user; and where the preservation steps, and provided instructions are based on vehicle condition, vehicle specifications, and airbag deployment condition after a collision;

as the primary field user step, communicating with a memory on one or more vehicle modules through the vehicle's onboard diagnostic port with a universal on-board diagnostic device (Bluetooth OBD adapter) connected to a user-computing device of the field user;

requesting the vehicle crash data evidence from the user-computing device, which includes plurality of first programmable instructions compatible to request and receive vehicle specific OBD-II PIDs (On-board diagnostics Parameter IDs);

transmitting and saving the extracted vehicle crash event data evidence through a wireless device communicatively coupled with the universal on-board diagnostic device to a user-computing device; if the vehicle crash data evidence is not retrievable or supported by the on-board diagnostic device then the field user either physically ships the vehicle module to the laboratory, or arranges for specialized equipment;

as the primary desk user step, performing a diagnosis to check whether one or more airbags deployed during the accident, and if the airbags deployed, then the vehicle module is physically shipped to the laboratory by a vehicle contact, and if the airbags are not deployed, then the required equipment is return shipped to a vehicle contact.

2. The method according to claim 1, further includes the step of transmitting the preserved vehicle crash data evidence in hexadecimal format to a remote application server directly from the vehicle through a communication network.

3. The method according to claim 1, further includes the step of processing the received vehicle crash data evidence at the remote application server through plurality of second programmable instructions, wherein the vehicle crash data evidence is retrieved and processed with a sequence of plurality of codes corresponding to the requirements of the specific vehicle.

4. The method according to claim 1, wherein the vehicle module is an airbag module.

5. The method according to claim 1, wherein the vehicle crash data evidence is hexadecimal event data stored in a memory integrated with the airbag module.

6. The method according to claim 1, wherein the wireless device is used to establish the communication between the on-board diagnostic port, and the user-computing device.

7. The method according to claim 1, further includes the step of guiding the user to preserve the vehicle crash data evidence through plurality of instructions, and plurality of options depicted over the web user interface.

8. The method according to claim 1, further includes the step of accessing the processed vehicle crash data evidence through the web user interface.

9. The method according to claim 1, further includes the step of providing the vehicle crash data evidence into a readable report format.

10. A system to preserve and further process vehicle crash data evidence, the system includes:
a web user interface to check, and select from a list of vehicles supporting internal recording of vehicle crash data evidence; support based on user type and location, in which the user type is at least one of: a field user in contact with the vehicle, and a desk user; and where the preservation steps, and provided instructions are based on vehicle condition, vehicle specifications, and airbag deployment condition after a collision;

a user-computing device of the field user communicates with a memory on one or more vehicle modules through the vehicle's on-board diagnostic port with a universal on-board diagnostic device (Bluetooth OBD adapter);

a wireless device communicatively coupled with the universal on-board diagnostic device is used to transmit the extracted vehicle crash data evidence to a user-computing device, wherein if the vehicle crash data evidence is not retrievable or supported by the on-board diagnostic device then the field user either physically ships the vehicle module to the laboratory, or uses a specialized equipment, wherein the desk user performs a diagnosis to check whether one or more airbags deployed during the accident, and if the airbags deployed then the vehicle module has to physically ship to the laboratory, and if the airbags are not deployed then the desk user coordinates with a field user who is shipped the required equipment;

a user-computing device to preserve the vehicle crash data evidence wirelessly received from the universal on-board diagnostic device, wherein the user-computing device includes plurality of first programmable instructions compatible to receive the vehicle crash data evidence from the universal on-board diagnostic device.

11. The system according to claim 10, further includes a remote application server to receive the transmitted vehicle crash data evidence from the user-computing device through a communication network.

12. The system according to claim 11, wherein the remote application server includes plurality of second programmable instructions to process the received vehicle crash data evidence at the remote application server, wherein the vehicle crash data evidence is retrieved with a sequence of plurality of codes corresponding to the requirements of specific vehicles.

13. The system according to claim 11, wherein the vehicle module is an airbag module.

14. The system according to claim 11, wherein the vehicle crash data evidence is hexadecimal event data stored in a memory integrated with the airbag module.

15. The system according to claim 11, wherein the wireless device is used to establish the communication between the on-board diagnostic port, and the user-computing device.

16. The system according to claim 11, further includes plurality of instructions and plurality of options depicted over the web user interface to guide the user to preserve the vehicle crash data evidence.

17. The system according to claim 11, wherein the web user interface enables the user to access the processed vehicle crash data in report format.

* * * * *